United States Patent Office 3,106,512
Patented Oct. 8, 1963

3,106,512
STABILIZATION OF TETRACYCLINE BASE IN DRY FORM WITH GLUCONO DELTA LACTONE
John A. Hill and Gilman N. Cyr, New Brunswick, N.J., assignors to Olin Mathieson Chemical Corporation, New York, N.Y., a corporation of Virginia
No Drawing. Filed July 19, 1961, Ser. No. 125,097
4 Claims. (Cl. 167—65)

In administering antibiotics, one goal to be attained is the efficient absorption of the substance so that a blood level is promptly established and maintained at a high level to combat the infection. When the antibiotic is administered orally or vaginally, the therapeutic effect is obtained by absorption. These modes of administration are usually effected by means of oral capsules or tablets and vaginal tablets. Not only must the antibiotic be absorbable, but it must be stable during storage prior to us and, in the case of oral preparations, be palatable as well. Moreover, since therapeutic agents are frequently combined in a single dosage form, the active ingredients must not adversely affect each other and maintain their potency.

Tetracycline, one of the much used broad spectrum antibiotics is now widely sold in the form of a phosphate complex in order to achieve desirable high blood levels. It has now been found that tetracycline base itself can be administered; good absorption of the base can be achieved and a high blood level established, especially initially. A stable formulation, e.g. in the form of capsules or tablets, can be prepared in which the tetracycline base itself is stable and, moreover, the antibiotic as well as any additional active ingredient incorporated with it are stable in the presence of each other.

The stable, well-absorbed tetracycline product of this invention is produced by incorporating with the tetracycline base glucono delta lactone. Glucono delta lactone is a nontoxic, stable crystalline substance which has a sweet taste and is palatable. It also does not have acidic properties which give rise to localized gastric irritation.

According to this invention, 0.5 to 1 part by weight of glucono delta lactone are incorporated with each part by weight of the tetracycline base.

Additional active ingredients may also be incorporated in the formulation, e.g. other antibiotics, antihistamines, analgesics such as amphotericin, chlorpheniramine, nystatin, and the like, in the usual ratios.

The glucono delta lactone is intimately admixed with the tetracycline antibiotic in dry form and with any other active ingredients in suitable proportions as indicated above. The mixture is then subdivided into dosage forms such as capsules, tablets and the like, containing the desired antibiotic potency. Fillers, lubricants or excipients may be used in the finished formulation according to conventional practice.

The following examples are illustrative of the invention:

Example 1

221 gm. of tetracycline base (equivalent to 200 gm. of tetracycline hydrochloride), 52.3 gm. of amphotericin B (equivalent to 40 gm. amphotericin B activity), 100 gm. of glucono delta lactone, 4.0 gm. of Emersol-132 (purified stearic acid lubricant) and lactose sufficient to make a total of 460 gm. were intimately admixed. The mixture was filled into 800 No. 0 capsules each containing 0.575 gm. to provide 276 mg. of tetracycline base (equivalent to 250 mg. tetracycline HCl), 65.4 mg. of amphotericin B (equivalent to 50 mg. amphotericin B activity) and 125 mg. of glucono delta lactone.

Example 2

221 gm. of tetracycline base, 52.3 gm. of amphotericin B, 100 gm. of glucono delta lactone, 4.0 gm. of Emersol-132 and lactose sufficient to make a total of 800 gm. were intimately admixed.

The mixture was compressed into vaginal tablets each of 1 gm. weight.

Example 3

221 gm. of tetracycline base, 100 gm. of glucono delta lactone, 4.0 gm. of Emersol-132 and lactose sufficient to make a total of 800 gm. were intimately admixed.

The mixture was compressed into vaginal tablets each of 1 gm. weight.

What is claimed is:
1. An antibiotic composition in dry form comprising tetracycline base and glucono delta lactone.
2. An antibiotic composition in dry form comprising an intimate admixture of tetracycline base with about 0.5 to 1 part by weight of glucono delta lactone for each part of said base.
3. An antibiotic composition in dry form comprising an intimate admixture of tetracycline base, glucono delta lactone and amphotericin.
4. An antibiotic tablet comprising tetracycline base and glucono delta lactone as the essential active ingredients.

References Cited in the file of this patent
UNITED STATES PATENTS

| | | |
|---|---|---|
| 1,936,364 | Pasternack et al. | Nov. 21, 1933 |
| 2,441,729 | Steiner | May 18, 1948 |
| 2,491,452 | Kern et al. | Dec. 13, 1949 |
| 2,583,534 | Mast | Jan. 29, 1952 |
| 2,692,845 | Mast | Oct. 26, 1954 |
| 2,713,307 | Adams | July 19, 1955 |
| 2,732,326 | Hecht et al. | Jan. 24, 1956 |
| 2,736,725 | Ritter | Feb. 28, 1956 |
| 2,795,528 | Buckwalter et al. | June 11, 1957 |
| 2,803,657 | Ritter | Aug. 20, 1957 |
| 2,873,276 | Blase | Feb. 10, 1959 |
| 2,886,595 | Heinemann et al. | May 12, 1959 |
| 2,903,356 | Lampen et al. | Sept. 8, 1959 |
| 2,908,611 | Dutcher et al. | Oct. 13, 1959 |
| 2,908,612 | Dutcher et al. | Oct. 13, 1959 |
| 2,944,541 | Sacchi et al. | July 12, 1960 |

OTHER REFERENCES

Merck Index, 7th ed. (1960), Merck & Co., Rahway, N.J.; entries: "Gluconolactone" (glucono delta lactone); "Gluconic acid"; "Glucomycin" (streptomycin sulfate glucuronolactone); page 484.